RADIO RECEIVER MOUNTED ON WALL RECEPTACLE

Filed Nov. 18, 1957 2 Sheets-Sheet 1

INVENTOR.
BERYL T. SALISBURY
BY
Barnes, Kisselle, Raisch & Choate
ATTORNEYS

April 26, 1960 B. T. SALISBURY 2,934,639

RADIO RECEIVER MOUNTED ON WALL RECEPTACLE

Filed Nov. 18, 1957 2 Sheets-Sheet 2

INVENTOR.
BERYL T. SALISBURY

BY

Barnes, Kisselle, Raisch & Choate

ATTORNEYS

United States Patent Office 2,934,639

Patented Apr. 26, 1960

2,934,639

RADIO RECEIVER MOUNTED ON WALL RECEPTACLE

Beryl T. Salisbury, Oak Park, Mich.

Application November 18, 1957, Serial No. 697,214

14 Claims. (Cl. 250—14)

This invention relates to radio receivers and particularly to small compact radio receivers which are portable.

Since the advent of television, the radio listening habits of people have been substantially changed. Surveys have indicated that radio listeners now tend to keep their radio receivers tuned to the same station. For example, a listener may prefer a particular type of program transmitted by a certain station and, accordingly, may keep his radio receiver tuned to that station. The radio listening habits have resulted in a majority of homes having a plurality of small radio receivers rather than a single large receiver.

The listening habits thus indicate that there is a need for a small lightweight low-cost portable receiver which is preset to receive a radio signal from only one radio station.

In addition, the civil defense authorities of the Federal, State and local governments have established that in time of emergency a single frequency will be used for transmitting radio messages in order that a potential enemy will not be able to locate cities by the various frequencies of the radio stations transmitting therefrom, In this very important activity there is a potential need for radio receivers which are present to receive only the emergency frequency which has been termed Conelrad.

It is therefore an object of this invention to provide a small compact radio receiver which is preset to receive a predetermined frequency.

It is a further object of this invention to provide such a radio receiver which may be plugged directly into an electrical wall outlet without the need for connecting wire cords.

It is a further object of this invention to provide such a radio receiver which may be manufactured at low cost.

It is a further object of this invention to provide such a radio receiver which has the exposed surfaces thereof made of unbreakable material.

It is a further object of this invention to provide such a radio receiver which has no exposed electrically conductive parts thereby making the receiver usable in areas of heavy moisture such as bathrooms.

Figure 1:
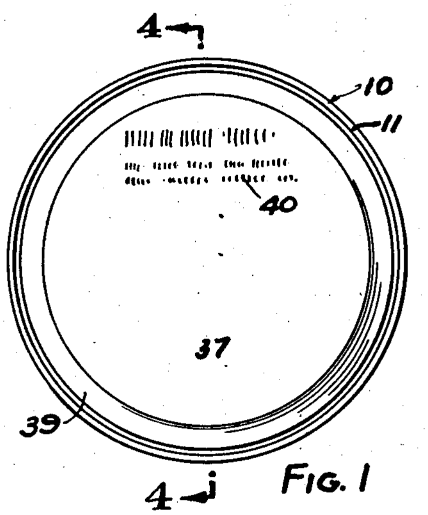
Fig. 1 is a front end view of a radio receiver embodying the invention.
Figure 2:
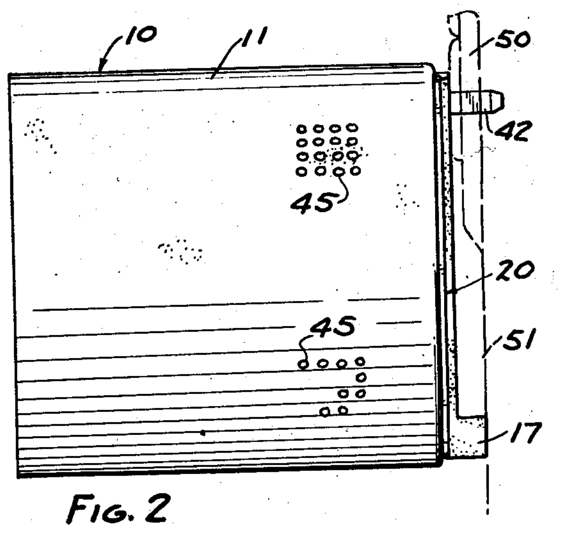
Fig. 2 is a side view of the radio receiver.

Referring to Figs. 1 and 2, the radio receiver embodying the invention comprises a housing 10 made of electrically non-conductive material such as plastic. The housing 10 is preferably made of a flexible translucent plastic material such as polyethylene and includes a cylindrical wall 11 of generally uniform thickness and an integral end wall 12 of generally uniform thickness.

Figures 6, 7, 8, 9, 10:
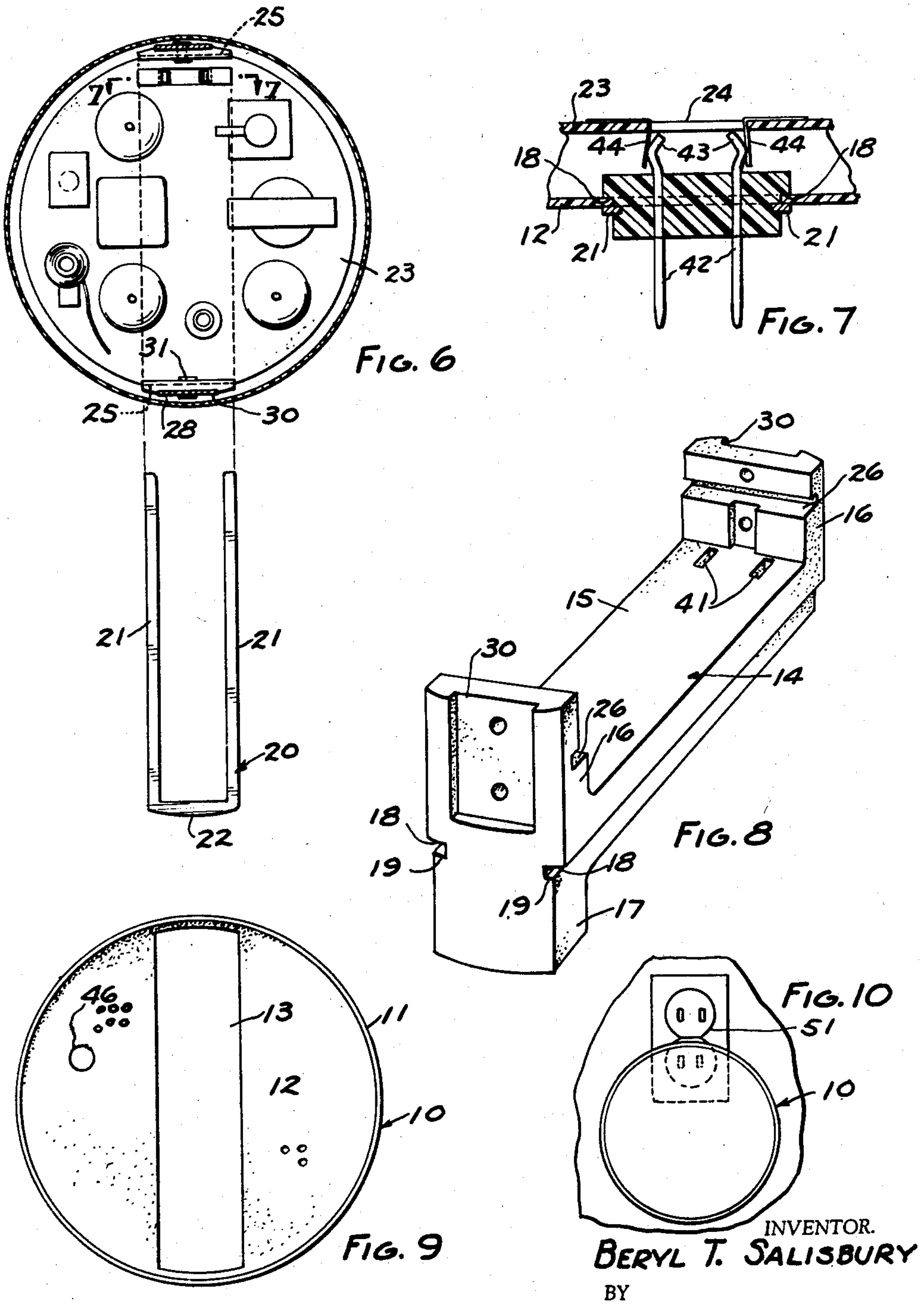
Fig. 6 is a sectional view taken along the line 6—6 in Fig. 4, parts being shown in exploded view.
Fig. 7 is a fragmentary sectional view on an enlarged scale taken along the line 7—7 in Fig. 6.
Fig. 8 is a perspective view on an enlarged scale of a part of the radio receiver.
Fig. 9 is an end view of the radio receiver housing.
Fig. 10 is an elevational view of the receiver mounted on a wall receptacle.

As shown in Fig. 9 end wall 12 is provided with an opening 13 extending diametrically across the end wall. A rigid block 14 of electrically non-conductive material such as polystyrene plastic is mounted in the opening 13 on the end wall 12.

As shown in Fig. 8 block 14 includes a generally rectangular body portion 15, end portions 16 extending at right angles from the ends of the body portion 15 and a projection 17 opposite one of the end portions 16 and extending at right angles from the body portion 15.

Body portion 15 is provided with a shoulder 18 along each side edge thereof. Shoulders 18 engage the inner surface of end wall 12 adjacent the side edges of opening 16. Block 14 also includes a groove 19 adjacent each shoulder 18. A spring clip 20 having legs 21 connected by a base 22 is used to hold the block 14 on the end wall 12. The legs 21 of clip 20 extend into grooves 19 and clamp the end wall 12 against the shoulders 18 (Fig. 7).

A radio chassis is mounted on the end portions 16 of block 14. The radio chassis includes a flat sheet 23 of plastic material which has an electrical circuit preferably printed thereon and which supports the components 24 of the radio chassis. Sheet 23 is circular and has diametrically opposed portions 25 of the periphery thereof flattened so that they are tightly received in transverse slots 26 on the inner surfaces of the end portion 16 of block 14 (Figs. 6 and 8).

Figures 3, 4, 5:
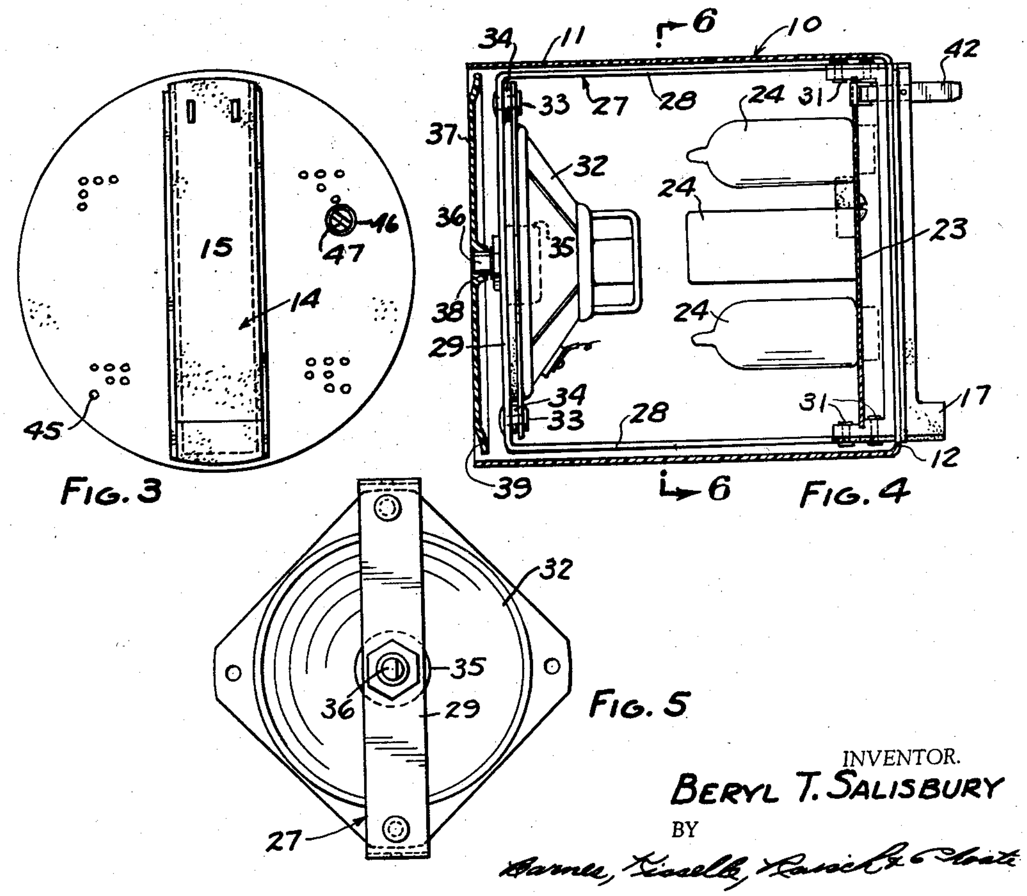
Fig. 3 is a rear end view.
Fig. 4 is a sectional view taken along the line 4—4 in Fig. 1.
Fig. 5 is a front end view of the radio receiver, parts being removed.

A U-shaped strap 27 of suitable material such as metal is mounted on the end portions 16 of the block 14 within the housing 10. As shown in Fig. 4 strap 27 includes parallel legs 28 connected by a bight portion 29. The free ends of the legs 28 extend into recesses 30 in the outer surface of the end portions 14 and are fixed thereon by rivets 31.

A loud speaker 32 is mounted on the bight portion 29 of the strap 27 adjacent the radio chassis by means of rivets 33. Resilient washers 34 are interposed between the speaker and the bight portion 29. The speaker is electrically connected to the radio chassis in accordance with well-known practice.

The volume control device 35 of the radio receiver is mounted on the bight portion 29 of strap 27. Volume control device 35 is of conventional construction and includes an operating member 36 which is rotatable. The device 35 is mounted on the strap with the axis of the operating member 36 aligned with the axis of housing 10.

A disc 37 of uniformly thin material is mounted on the operating member 36 by providing an enlarged portion 38 in the disc 37 into which the end of the operating member 36 extends. By this arrangement when the disc 37 is rotated, the volume control device 35 is adjusted to control the volume. An inwardly extending annular flange 39 is provided along the periphery of disc 37 to serve as a means for facilitating the grasping of the disc in order to adjust the volume. Advertising data 40 may be provided on the surface of the disc 37.

Referring to Fig. 8, body portion 15 of block 14 is provided with spaced openings 41 into which electrically conductive prongs 42 are press fitted to provide a plug for the radio receiver. The inner ends 43 of prongs 42 are bent into contact with flexible contacts 44 which are mounted on the face of sheet 23 and extend through an opening 24 axially and radially outwardly from the sheet (Figs. 4, 6 and 7).

In order to provide adequate ventilation the side wall 11 of the housing is preferably formed with a plurality of groups of perforations 45.

End wall 12 is provided with an opening 46 which permits access to the tuning condenser 47 (Fig. 3) which is mounted on the sheet 23. By this arrangement a dealer or other person may tune the radio receiver to the predetermined desired frequency which the customer wishes to listen to. In the case of civil defense activities the tuning condenser 47 could be adjusted so that the radio receiver is tuned to the Conelrad frequency.

The radio receiver is assembled by first mounting the sheet 23, strap 27 carrying loudspeaker 32 and volume control device 35 on block 14. This assembly is then inserted in housing 10 through the open end thereof to bring the shoulders 18 of the block 14 into contact with the side edges of opening 13 in end wall 12 of the housing. Clip 20 is then placed in position and the disc 37 is mounted on the member 36.

In use, the radio receiver is plugged into an electrical outlet provided by a receptacle 50 on a wall 51 of a room (Fig. 2). Since the prongs 42 are adjacent the periphery of the end wall 12, the major portion of the radio receiver is vertically below the outlet. The projection 17 on the block 14 engages the wall and maintains the radio receiver level. Since the major portion of the weight of the radio is adjacent end wall 12, the center of gravity of the radio is near the wall of the room and there is little tendency for the weight of the radio to tend to pull the prongs 42 out of the wall receptacle 50. The projection 17 also assists in preventing the weight of the radio receiver from causing the prongs 42 to move outwardly out of the receptacle 50.

In this position the radio receiver provides reception of a particular predetermined frequency. The volume may be readily controlled by rotating disc 37. Since all exposed parts except prongs 42 are made of non-conductive material, the radio receiver may be used with safety in areas of high moisture such as bathrooms. The use of a flexible housing 10 makes the radio receiver quite safe and unbreakable. At night the light emanating from the components of the radio chassis is partially transmitted through the housing, when translucent material is used, to serve as a night light.

The radio receiver embodying the invention requires no external wires or cords and results in a great saving of floor space.

The radio receiver is easily moved from one room to another.

In addition to the aforementioned advantages, the radio receiver embodying the invention may be manufactured at lost cost.

I claim:

1. A lightweight portable radio receiver comprising a housing having a wall closing one end thereof, a plug having spaced prongs mounted in said closed end of said housing with the prongs extending generally axially outwardly, said plug being positioned adjacent the periphery of said end wall, a radio chassis mounted within said housing with the major portion of the weight thereof adjacent said closed end wall of said housing and on one side of said plug, means forming an electrical connection between said prongs of said plug and said radio chassis, whereby said radio receiver may be mounted directly on a wall of a room by plugging said prongs into an electrical wall outlet with the major portion of said housing extending vertically below said plug and a portion of said closed end wall contacting the wall below said outlet.

2. The combination set forth in claim 1 including a projection on said closed end wall at a point diametrically opposite from said plug and extending generally axially of said housing, said projection being adapted to contact said wall below said electrical outlet to support said receiver and maintain said receiver level.

3. The combination set forth in claim 1 including a circular disc, the other end of said housing being open, means for mounting said disc in said open end of said cylindrical housing, said chassis including a volume control and means for operatively connecting said disc to said volume control whereby rotation of said disc controls said volume control.

4. The combination set forth in claim 3 wherein said disc includes an annular flange around the periphery thereof to provide a means for grasping said disc to facilitate rotation thereof.

5. A lightweight portable radio receiver comprising a housing, said housing having one end closed by an end wall, the other end of said housing being open, a block of electrically non-conductive material mounted on said end wall, means for supporting a radio chassis on said block, a U-shaped strap within said housing having generally parallel legs connected by a bight portion, means for fastening the ends of said legs to said block with the bight portion extending away from said block, a radio speaker mounted on said bight portion of said strap and electrically connected to said radio chassis, a volume control device mounted on said strap and including a rotatable operating member, and a rotatable disc closing the open end of said housing and operatively connected to said operating member, whereby rotation of said disc adjusts said volume control device.

6. The combination set forth in claim 5 wherein said block comprises a body portion extending generally transversely of said housing, and end portions extending generally axially of said housing, the ends of said legs of said strap being fastened to said end portions.

7. The combination set forth in claim 6 wherein said radio chassis comprises a flat sheet of non-conductive material, said sheet supporting the components of said radio chassis, said end portions of said block including slots in the inner surfaces thereof, portions of said flat sheet engaging said slots, thereby holding said flat sheet in spaced relationship to the body portion of said block.

8. The combination set forth in claim 7 wherein said flat sheet includes an opening, flat flexible electrically conducting contacts mounted on said sheet, portions of said contacts extending through said opening, and a plug mounted in the end wall of said housing and including spaced prongs extending axially inwardly into contact with said flexible contacts.

9. The combination set forth in claim 5 including an opening in said end wall, means for supporting said block in said end wall comprising a shoulder along the sides of said block for engaging the sides of said opening in said end wall, a groove in said block adjacent each shoulder, and a clip extending in said grooves and adapted to hold said end wall against said shoulder.

10. A lightweight portable radio receiver comprising a housing made of flexible plastic material, said housing including a generally cylindrical side wall and an integral end wall closing one end thereof, the other end of said housing being open, said end wall being provided with a diametrically extending opening, a block of rigid plastic material, means for mounting said block in said opening, a radio chassis including a circular flat sheet of plastic material for supporting the components of the radio chassis, means for mounting said flat sheet on said block with said sheet in spaced relationship to said block, a pair of prongs mounted in said block adjacent the periphery of said end wall, means forming an electrical connection between said flat sheet and said prongs, said prongs extending axially outwardly from said block for engagement with an electrical outlet, a U-shaped strap within said housing having legs connected by a bight portion, means for mounting the free ends of said legs of said straps on said block with the legs extending axially of said housing and the bight portion of said strap adjacent the open end of said housing, a loud speaker, means for mounting said loud speaker on said bight portion of said strap adjacent said radio chassis, a volume control device having a rotatable operating member, means for mounting said volume control device on said strap with said rotatable operating member extending axially of said housing, a circular disc, and means for mounting said circular disc on said operating member.

11. The combination set forth in claim 10 wherein said block comprises a generally rectangular body portion and end portions extending at generally right angles to the body portion and generally axially of the housing, said flat sheet and said free ends of said straps being mounted on said end portions.

12. The combination set forth in claim 11 wherein said means for mounting said flat sheet on said end portions of said block comprises a slot on the inner surface of each said end portion into which a portion of the periphery of said flat sheet extends.

13. The combination set forth in claim 11 wherein said means for mounting the free ends of said legs of said strap on said end portions comprises a recess on the outer surface of each said end portion into which the free end of the leg of the strap extends.

14. The combination set forth in claim 10 wherein said means for mounting said block on said housing comprises a shoulder along each side edge of said block, said shoulder engaging the side edges of said opening in the end wall of the housing, a groove extending longitudinally of said block adjacent each shoulder, and a U-shaped clip having spaced parallel legs, said legs being received in said grooves and clamping said end wall of said housing against said shoulders of said block.

References Cited in the file of this patent

UNITED STATES PATENTS

| | | |
|---|---|---|
| 2,046,927 | Riley | July 7, 1936 |
| 2,108,846 | Brown | Feb. 22, 1938 |
| 2,514,246 | Knox | July 4, 1950 |
| 2,630,526 | Zelov | Mar. 3, 1953 |
| 2,662,975 | Schwarz | Dec. 15, 1953 |
| 2,820,890 | Koch | Jan. 21, 1958 |

FOREIGN PATENTS

| | | |
|---|---|---|
| 963,196 | France | Dec. 26, 1949 |